(12) United States Patent
Kim et al.

(10) Patent No.: US 8,403,787 B2
(45) Date of Patent: Mar. 26, 2013

(54) HYDRAULIC CONTROL SYSTEM OF POWER TRAIN FOR HYBRID VEHICLE

(75) Inventors: Youngchul Kim, Gwangmyeong-si (KR); Gwangseob Shin, Ansan-si (KR); Jonghyun Kim, Suwon-si (KR); Yeonho Kim, Suwon-si (KR); Jaeshin Yi, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 332 days.

(21) Appl. No.: 12/881,563

(22) Filed: Sep. 14, 2010

(65) Prior Publication Data

US 2011/0136608 A1    Jun. 9, 2011

(30) Foreign Application Priority Data

Dec. 4, 2009    (KR) .................. 10-2009-0119717

(51) Int. Cl.
*F16H 3/72*    (2006.01)
*F16H 3/44*    (2006.01)
*F16H 31/00*    (2006.01)

(52) U.S. Cl. .............................. 475/5; 475/282; 475/133
(58) Field of Classification Search .......... 477/5; 475/5, 475/282, 119, 120, 121, 130, 131, 133
See application file for complete search history.

(56) References Cited

U.S. PATENT DOCUMENTS

| | | | | |
|---|---|---|---|---|
| 6,299,560 | B1 * | 10/2001 | Fujioka et al. | 475/119 |
| 7,811,192 | B2 * | 10/2010 | Hong | 475/119 |
| 7,854,676 | B2 * | 12/2010 | Park | 475/120 |
| 2002/0061803 | A1 | 5/2002 | Aoki | |
| 2008/0318723 | A1 * | 12/2008 | Kang et al. | 475/119 |
| 2009/0107796 | A1 * | 4/2009 | Hong | 192/12 C |

FOREIGN PATENT DOCUMENTS

| | | |
|---|---|---|
| JP | 2001-105909 A | 4/2001 |
| JP | 2002-209305 A | 7/2002 |
| JP | 2002-337571 A | 11/2002 |
| JP | 2007-118717 A | 5/2007 |
| KR | 10-0844724 B1 | 7/2008 |
| KR | 10-2009-0043123 A | 5/2009 |

* cited by examiner

*Primary Examiner* — Roger Pang
(74) *Attorney, Agent, or Firm* — Morgan, Lewis & Bockius LLP

(57) ABSTRACT

The present invention provides a hydraulic control system of a power train for a hybrid vehicle that allows the power train of a hybrid vehicle to implement all of two or more EV modes, two or more power split modes, and at least three or more fixed-stage modes, with a relatively simple configuration, and achieves satisfactory power performance of the power train and fuel efficiency and reduce the cost of the valve body, remove possibility of malfunction, and implements a limp home function when a controller is broken.

26 Claims, 10 Drawing Sheets

FIG.2

| | | | NOT OPERATE |
|---|---|---|---|
| ENGINE START MODE | ENGINE START IN STOP | ENGINE START IN STOP, USING MG1 AND PG1 | BK2 |
| | ENGINE START IN EV DRIVING | ENGINE START IN EV TRAVELING, USING MG1 | BK2 |
| EV TRAVELING MODE | EV1 | DRIVE VEHICLE WITH ONLY MG2, ENGINE IN STOP, MG1 IDLE | BK2 |
| | REV | VEHICLE MOVE BACKWARD WITH REVERSE OF MG2, ENGINE IN STOP, MG1 IDLE | BK2 |
| | EV2 | DRIVE ENGINE WITH MG1+MG2, ENGINE STOPPED BY BK2 | BK2, CL1 |
| POWER SPLIT MODE | INPUT SPLIT MODE | ELECTRICAL PATH FROM MG1 TO MG2 GENERATED, WITH OPTIMAL-EFFICIENCY OPERATION OF ENGINE | BK2 |
| | COMPOUND SPLIT MODE | OPTIMAL-EFFICIENCY OPERATION OF ENGINE, ELECTRIC PATH ELECTRIC ENERGY TO INPUT SPLIT MODE REDUCED | CL1 |
| FIXED-STAGE MODE | FIRST STAGE [UD] | PARALLEL HYBRID SYSTEM, ONLY MG2 ASSIST/ONLY MG1 ASSIST/MG2+MG1 ASSIST/INDIVIDUAL DRIVING OF ENGINE POSSIBLE | CL2, BK2 |
| | SECOND STAGE [1:1] | PARALLEL HYBRID SYSTEM, ONLY MG2 ASSIST/ONLY MG1 ASSIST/MG2+MG1 ASSIST/INDIVIDUAL DRIVING OF ENGINE POSSIBLE | CL1, CL2 |
| | THIRD STAGE [OD] | PARALLEL HYBRID SYSTEM, MG2 ASSIST POSSIBLE | CL1, BK1 |

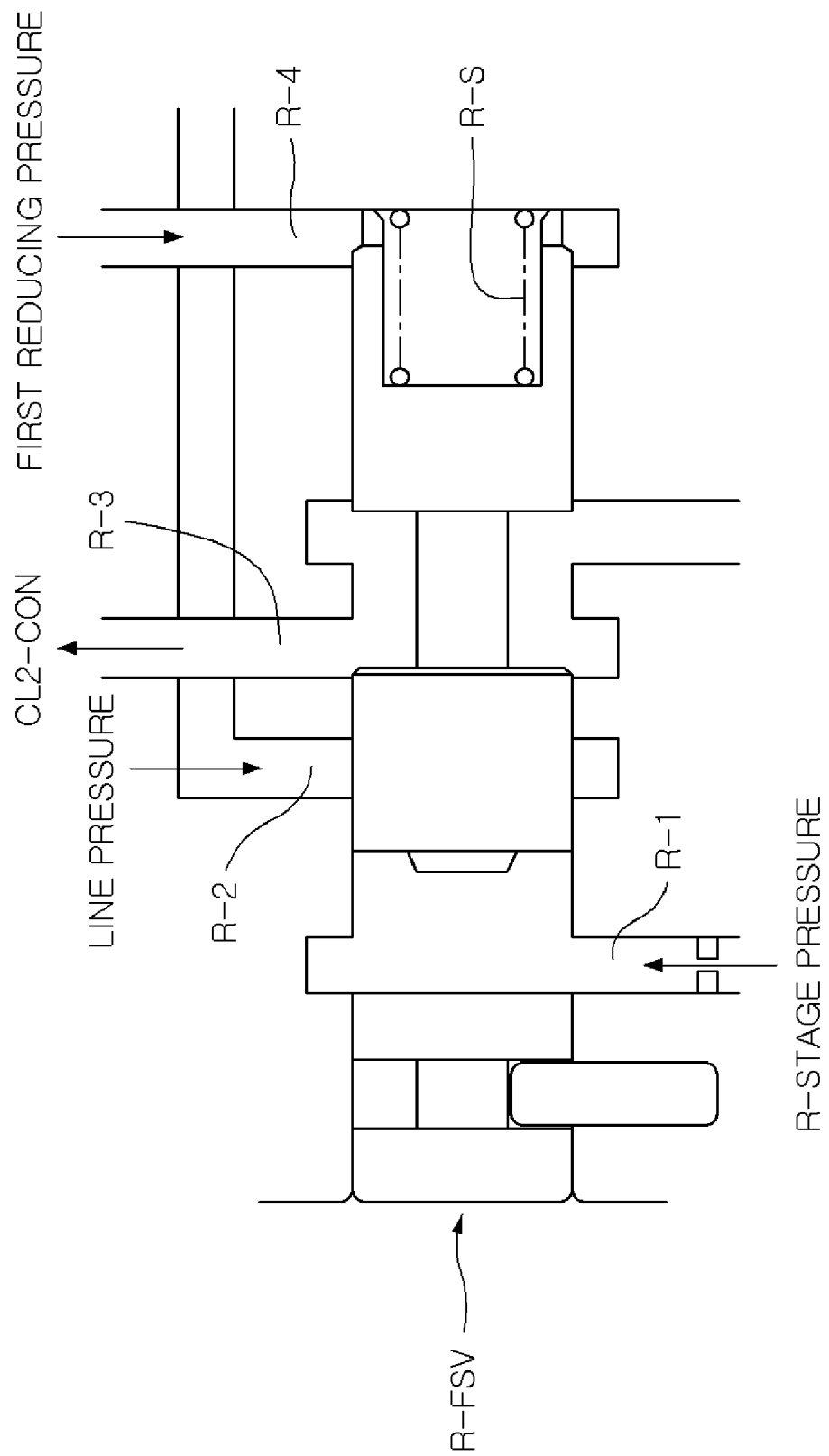

HYDRAULIC CONTROL SYSTEM OF POWER TRAIN FOR HYBRID VEHICLE

CROSS-REFERENCE TO RELATED APPLICATIONS

The present application claims priority to Korean Patent Application Number 10-2009-0119717 filed Dec. 4, 2009, the entire contents of which application is incorporated herein for all purposes by this reference.

BACKGROUND OF THE INVENTION

1. Field of the Invention

The present invention relates to a hydraulic control system of a power train for a hybrid vehicle, in more detail, a hydraulic control technology for controlling a power train of a hybrid vehicle which can implement two or more power split modes and three or more fixed-stage modes.

2. Description of Related Art

FIG. 1 illustrates the configuration of a power train of a hybrid vehicle using the present invention, which includes an engine Engine, a first motor generator MG1, and a second motor generator MG2. Further, a first planetary gear set PG1 and a second planetary gear set PG2 are provided to receive from the engine and the motor generators, such that the output for the driving wheels comes from the second planetary gear set.

The planetary gear set is a singe pinion planetary gear set including a first sun gear S1, a first carrier C1, and first ring gear R1 and the second planetary gear set is a single pinion planetary gear set including a second sun gear S2, a second carrier C2, and a second ring gear R2, in which the second carrier is directly connected with the first ring gear and connected to the driving wheels through an output member Output.

Total four operating members are connected to the rotary members of the first planetary gear set and the second planetary gear set to restrict rotation of the rotary members, such that it is possible to implement various driving modes with the engine, the first motor generator, and the second motor generator, as shown in FIG. 2.

That is, a first brake BK1 is connected to first sun gear S1, a second brake BK2 is connected to second ring gear R2, a first clutch CL1 is connected between first carrier C1 and second ring gear R2, a second clutch CL2 is connected between first carrier C1 and second sun gear S2, engine Engine is connected to first carrier C1, first motor generator MG1 is connected to first sun gear S1, second motor generator MG2 is connected to second sun gear S2, such that it is possible to implement various driving modes, in accordance with the operational states of first brake BK1, second brake BK2, first clutch CL1, and second clutch CL2, which are the operating members, the engine, and the first motor generator and the second motor generator.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a hydraulic control system of a power train for a hybrid vehicle that allows the power train of a hybrid vehicle to implement all of a plurality of EV modes, a plurality of power split modes, and a plurality of fixed-stage modes, with a relatively simple configuration, and achieves satisfactory power performance of the power train and fuel efficiency and reduce the cost of the valve body.

An aspect of the present invention provides a hydraulic control system of a power train for a hybrid vehicle, which includes a line pressure and lubrication pressure generating unit that generates predetermined line pressure and lubrication pressure for lubrication, using hydraulic pressure supplied from an oil pump, a first reducing valve that generates first reducing pressure by decreasing the line pressure, a second reducing valve that generates second reducing pressure by decreasing the line pressure, a first clutch control unit that receives the line pressure, the first reducing pressure, and the second reducing pressure and controls a first clutch, a second clutch control unit that receives the line pressure, the first reducing pressure, and the second reducing pressure and controls a second clutch, a first brake control unit that receives the line pressure, the first reducing pressure, and the second reducing pressure and controls a first brake, a second brake control unit that receives the line pressure, the first reducing pressure, and the second reducing pressure and controls a second brake, and a manual valve MV that receives the line pressure, and supplies the line pressure to the first brake control unit, the second brake control unit, and the first clutch control unit in a D-stage state, and supplies the line pressure to the second brake-control unit in the R-stage state.

Another aspect of the present invention provides a hydraulic control system of a power train for a hybrid vehicle, which includes a line pressure and lubrication pressure generating unit that generates predetermined line pressure and lubrication pressure for lubrication, using hydraulic pressure supplied from an oil pump, a first reducing valve and a second reducing valve that generate first reducing pressure and second reducing pressure by decreasing the line pressure, a first clutch control unit, a second clutch control unit, a first brake control unit, and a second brake control unit that receive the line pressure, the first reducing pressure, and the second reducing pressure and respectively control a first clutch, a second clutch, a first brake, and a second brake, which are operating members to control, a manual valve and a D-R check valve that receive the line pressure, supply the line pressure to the first brake control unit, the second brake control unit, and the first clutch control unit in a D-stage state, and supply the line pressure to the second brake-control unit and the first clutch control unit in an R-stage state, an R-stage fail-safe valve that stops the line pressure and the lien pressure directly supplied from the lubrication pressure generating unit to the second clutch control unit in the R-stage state, a second brake fail-safe valve that removes the hydraulic pressure of the second brake when operation pressure is supplied to both the first clutch and the second clutch, and a first brake fail-safe valve that removes the hydraulic pressure of the first brake when operation pressure is supplied to any one of the second brake and the second clutch.

The present invention allows the power train of a hybrid vehicle to implement all of two or more EV modes, two or more power split modes, and at least three or more fixed-stage modes, with a relatively simple configuration, and achieves satisfactory power performance of the power train and fuel efficiency and reduce the cost of the valve body, remove possibility of malfunction, and implements a limp home function when a controller is broken.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is a table showing drive modes implemented by the power train shown in FIG. 1.

FIG. 10 is a view showing in detail the R-stage fail-safe valve shown in FIG. 3.

Figure 1:
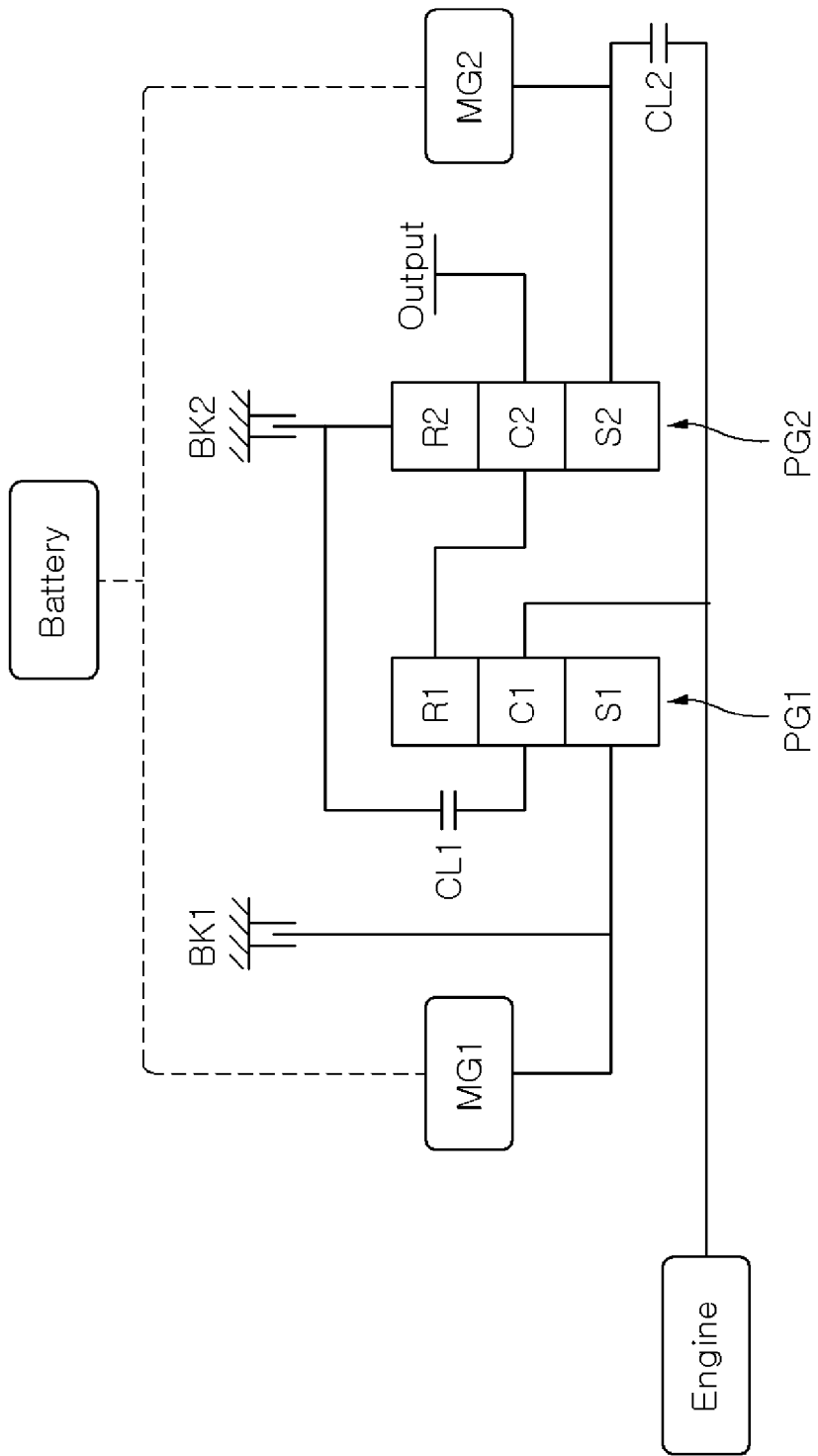
FIG. 1 is a diagram illustrating a power train of a hybrid vehicle using the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
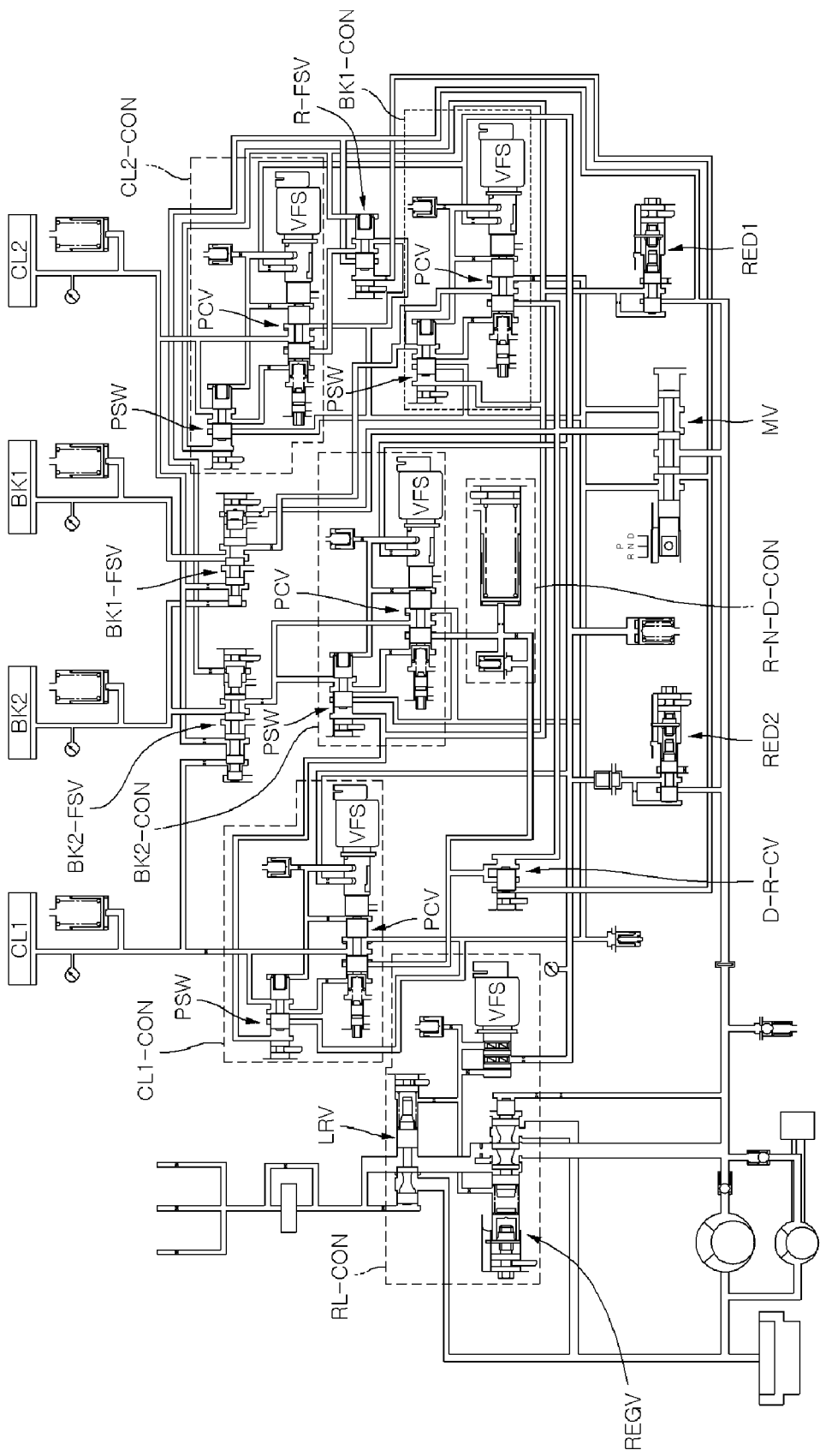
FIG. 3 is a diagram illustrating the configuration of an exemplary hydraulic control system of a power train for a hybrid vehicle according to the present invention.

Referring to FIG. 3, an exemplary embodiment of the present invention includes a line pressure and lubrication pressure generating unit RL-CON that generates predetermined line pressure and lubrication pressure for lubrication, using hydraulic pressure supplied from an oil pump, a first reducing valve RED1 and a second reducing valve RED2 that generate first reducing pressure and second reducing pressure respectively by decreasing the line pressure, a first clutch control unit CL1-CON, a second clutch control unit CL2-CON, a first brake control unit BK1-CON, and a second brake control unit BK2-CON that receive the line pressure, the first reducing pressure, and the second reducing pressure and respectively control a first clutch CL1, a second clutch CL2, a first brake BK1, and a second brake BK2, which are operating members to control, a manual valve MV and a D-R check valve D-R-CV that receive the line pressure, supply the line pressure to first brake control unit BK1-CON, the second brake control unit BK2-CON, and first clutch control unit CL1-CON in the D-stage state, and supply the line pressure to second brake-control unit BK2-CON and first clutch control unit CL1-CON in the R-stage state, an R-stage fail-safe valve R-FSV that stops the line pressure and the lien pressure directly supplied from lubrication pressure generating unit RL-CON to second clutch control unit CL2-CON in the R-stage state, a second brake fail-safe valve BK2-FSV that removes the hydraulic pressure of second brake BK2 when operation pressure is supplied to both first clutch CL1 and second clutch CL2, and a first brake fail-safe valve BK1-FSV that removes the hydraulic pressure of first brake BK1 when operation pressure is supplied to any one of second brake BK2 and second clutch CL2.

First clutch CL1, second clutch CL2, first brake BK1, and second brake BK2 are, as shown in FIG. 1, included in the power train of a hybrid vehicle that includes, a first planetary gear set PG1 including a first sun gear S1, a first carrier C1, and a first ring gear R1, a second planetary gear set PG2 including a second carrier C2 directly connected to first ring gear R1, a second sun gear S2, and a second ring gear R2, a first motor generator MG1 connected to first sun gear S1 of first planetary gear set PG1, a second motor generator MG2 connected to second sun gear S2 of second planetary gear set PG2, an engine Engine connected to first carrier C1 of first planetary gear set PG1, and an output member Output connected to second carrier C2 of second planetary gear set PG2.

First clutch CL1 is disposed to connect/disconnect first carrier C1 and second ring gear R2, second clutch CL2 is disposed to connect/disconnect first carrier C1 and second sun gear S2, first brake BK1 is disposed to restrict rotation of first sun gear S1, and second brake BK2 is disposed to restrict rotation of second ring gear R2.

Line pressure and lubrication pressure generator RL-CON includes, a variable force solenoid valve VFS that receives second reducing pressure from second reducing valve RED2 and generates solenoid control pressure, a regulator valve REGV that is controlled by the solenoid control pressure from variable force solenoid valve VFS and generates the line pressure, using the hydraulic pressure supplied from the oil pump, and a lubrication pressure regulator valve LRV that is controlled by the solenoid control pressure from variable solenoid valve VFS and generates the lubrication pressure, using the hydraulic pressure from regulator valve REGV.

Figure 4:
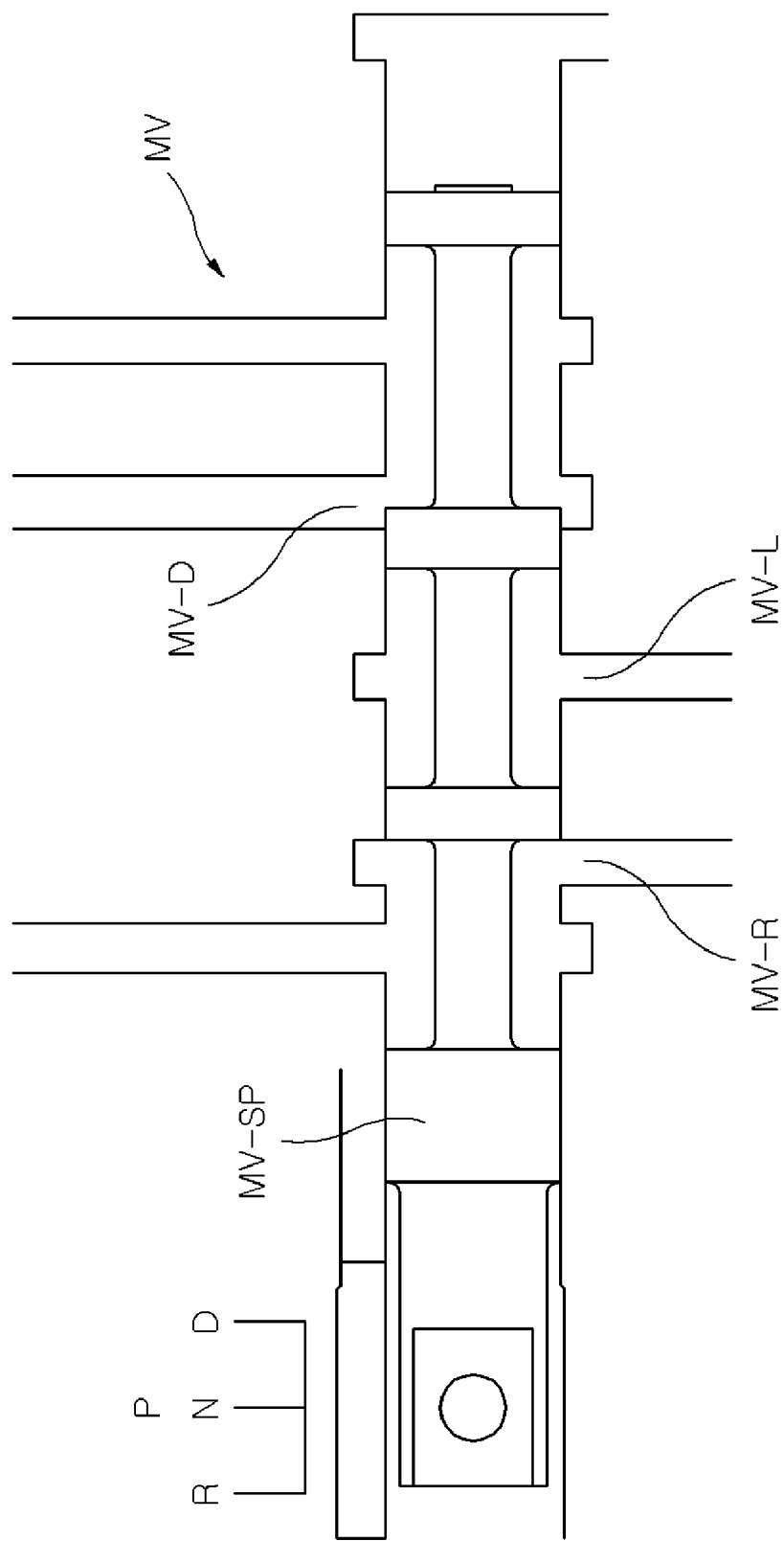
FIG. 4 is a view showing in detail the manual valve shown in FIG. 3.

Manual valve MV, as shown in detain in FIG. 4, includes a line pressure port MV-L that receives line pressure from line pressure and lubrication pressure generating unit RL-CON, a D-stage port MV-D that supplies line pressure to first brake control unit BK1-CON, second brake control unit BK2-CON, and first clutch control unit CL1-CON, an R-stage port MV-R that supplies line pressure to second brake control unit BK2-CON and first clutch control unit CL1-CON, and a valve spool MV-SP that implements a P-stage and an N-stage at the same position where line pressure port MV-L is isolated, moves from the N-stage position to one side such that line pressure port MV-L communicates with D-stage port MV-D, and to the other side such that line pressure port MV-L communicates with R-stage port MV-R.

That is, the P-stage and the N-stage are set to the same position at the center, such that the D-stage state where line pressure port MV-L communicates with only D-stage port MVD is implemented by moving valve spool MV-SP to the right side from the P-stage and N-stage and the R-stage state where line pressure port MV-L communicates with only R-stage port MV-R by moving valve spool MV-SP to the left side.

Figure 5:
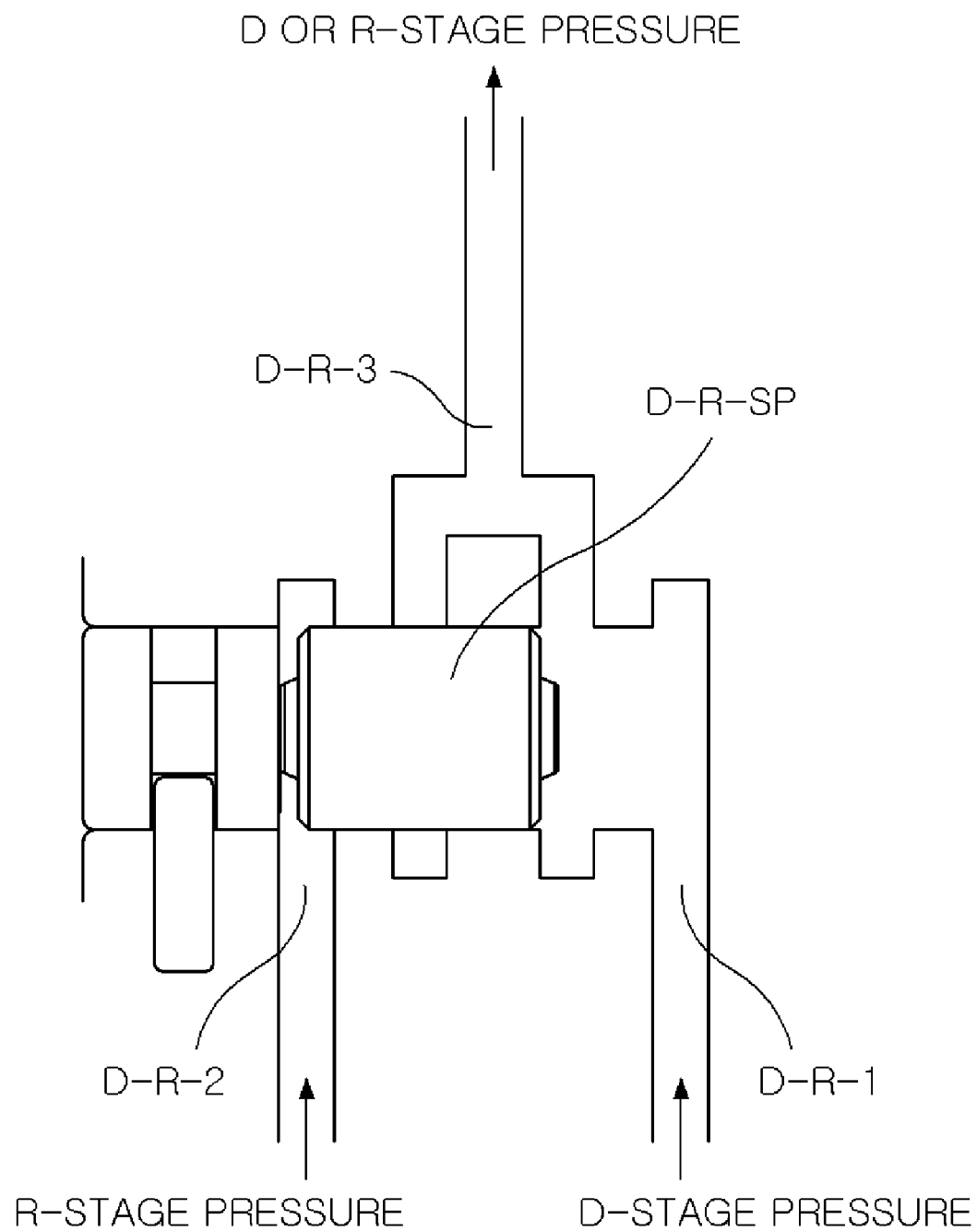
FIG. 5 is a view showing in detail the D-R check valve shown in FIG. 3.

D-R check valve D-R-CV, as shown in FIG. 5, includes a first port D-R-1 that is connected to D-stage port MV-D of manual valve MV, a second port D-R-2 that is connected to R-stage port MV-R of manual valve MV, a third port D-R-3 that is connected to first clutch control unit CL1-CON and second brake control unit BK2-CON, and a valve spool D-R-SP that slides straight such that first port D-R-1 communicates with third port D-R-3 when hydraulic pressure is supplied to first port D-R-1 and second port D-R-2 communicates with third port D-R-3 when hydraulic pressure is supplied to second port D-R-2.

Therefore, D-R check valve D-R-CV operates with selection of the D-stage and the R-stage of manual valve MV, such that the line pressure from manual valve MV is supplied to first clutch control unit CL1-CON and second brake control unit BK2-CON through third port D-R-3, regardless of that manual valve MV is in the D-stage state or the R-stage state.

The present embodiment further includes an R-N-D static control unit R-N-D-CON between manual valve MV and second brake control unit BK2-CON to relatively rapidly supply the line pressure from manual valve MV to second brake control unit BK2-CON, and relatively slowly remove the hydraulic pressure from second brake control unit BK2-CON.

Figure 6:
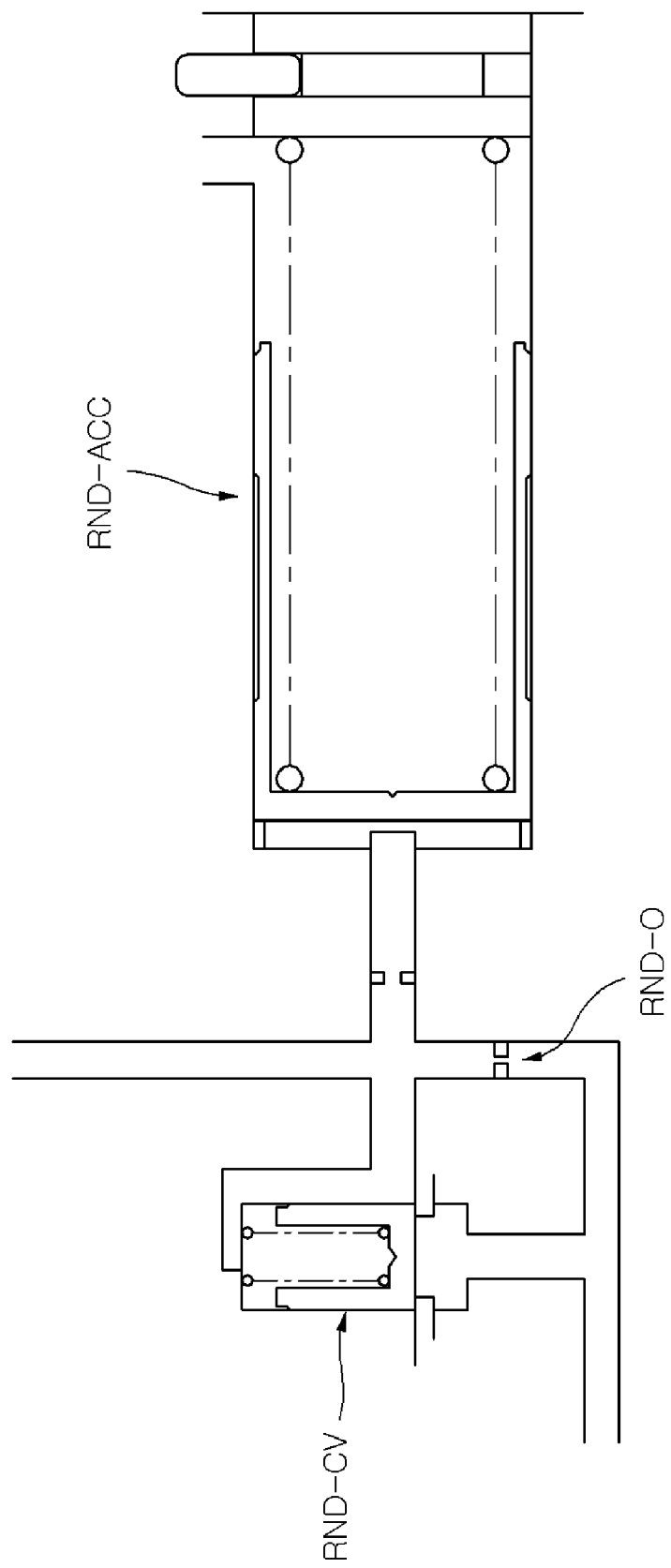
FIG. 6 is a view showing in detail the R-N-D static control unit shown in FIG. 3.

In the present embodiment, R-N-D static control unit R-N-D-CON is disposed between D-R check valve D-R-CV and second brake control unit BK2-CON, and R-N-D static control unit R-N-D-CON, as shown in FIG. 6, includes an RND check valve RND-CV that forms only a channel to second brake control unit BK2-CON from D-R check valve D-R-CV, an orifice RND-O that is formed in a channel detouring RND check valve RND-CV, and an accumulator RND-ACC that is disposed between orifice RND-O and second brake control unit BK2-CON.

R-N-D static control unit R-N-D-CON described above improves response by allowing line pressure to be rapidly supplied to second brake BK2 through second brake control unit BK2-CON, when a driver moves the shift lever from the P-stage or the N-stage to the D-stage or the R-stage, and relatively slowly removes the hydraulic pressure of second brake BK2 through second brake control unit BK2-CON to maintain a predetermined level of hydraulic pressure of second brake BK2, when the shift lever is moved from the D-stage or the R-stage to the N-stage and the P-stage, such that control performance is improved when the driver repeatedly and rapidly moves the shift lever between the N-stage, the R-stage, and the D-stage, for parking, and rapid response is ensured when a shift shock does not occur.

In this configuration, the reason that R-N-D static control unit R-N-D-CON controls the line pressure supplied to second brake BK2, as described, is that, as can be seen from FIG. 2, only second brake BK2 is engaged in both the EV1 mode and the rearward mode, which are used to start a vehicle, in a hybrid vehicle, and also that second brake BK2 is the operating member that are used the most driving modes.

First brake control unit BK1-CON includes a normally-low type variable force solenoid valve VFS that generates solenoid control pressure using second reducing pressure received from second reducing valve RED2, a pressure control valve PCV that is integrally formed at one side of variable force solenoid valve VFS and outputs operation pressure of first brake BK1, using the line pressure, and a pressure switch valve PSW that is converted to feedback or stop a portion of operation pressure, supplied to first brake BK1, to pressure control valve PCV, using first reducing pressure received from first reducing valve RED1 at one side and solenoid control pressure from variable force solenoid valve VFS from the other side.

Second brake control unit BK2-CON includes a normally-high type variable force solenoid valve VFS that generates solenoid control pressure using second reducing pressure received from second reducing valve RED2 and, a pressure control valve PCV that is integrally formed at one side of variable force solenoid valve VFS and outputs operation pressure of second brake BK2, using the line pressure, a pressure switch valve PSW that is converted to feedback or stop a portion of operation pressure, supplied to second brake BK2, to pressure control valve PCV, using first reducing pressure received from first reducing valve RED1 at one side and solenoid control pressure from variable force solenoid valve VFS from the other side.

First clutch control unit CL1-CON includes a normally-high type variable force solenoid valve VFS that generates solenoid control pressure using second reducing pressure received from second reducing valve RED2 and, a pressure control valve PCV that is integrally formed at one side of variable force solenoid valve VFS and outputs operation pressure of first clutch CL1, using the line pressure, a pressure switch valve PSW that is converted to feedback or stop a portion of operation pressure, supplied to first clutch CL1, to pressure control valve PCV, using first reducing pressure received from first reducing valve RED1 at one side and solenoid control pressure from variable force solenoid valve VFS from the other side.

Second clutch control unit CL2-CON includes a normally-high type variable force solenoid valve VFS that generates solenoid control pressure using second reducing pressure received from second reducing valve RED2 and, a pressure control valve PCV that is integrally formed at one side of variable force solenoid valve VFS and outputs operation pressure of second clutch CL2, using the line pressure, a pressure switch valve PSW that is converted to feedback or stop a portion of operation pressure, supplied to second clutch CL2, to pressure control valve PCV, using first reducing pressure received from first reducing valve RED1 at one side and solenoid control pressure from variable force solenoid valve VFS from the other side.

That is, first brake control unit BK1-CON, second brake control unit BK2-CON, first clutch control unit CL1-CON, and second clutch control unit CL2-CON all have substantially the same structure, and respectively includes variable force solenoid valve VFS that generates the solenoid control pressure, using the second reducing pressure from second reducing valve RED2, pressure control valve PCV that is integrally formed an one side of variable force solenoid valve VFS and outputs the operation pressure for one corresponding operating member to control in first brake BK1, second brake BK2, first clutch CL1, and second clutch CL2, using the line pressure received, and pressure switch valve PSW that is converted to feedback or stop a portion of the operation pressure supplied to the corresponding operating member to control to pressure control valve PCV, using the first reducing pressure received from first reducing valve RED1 at one side of the valve spool and the solenoid control pressure received from variable force solenoid valve VFS from the other side.

Figure 7:
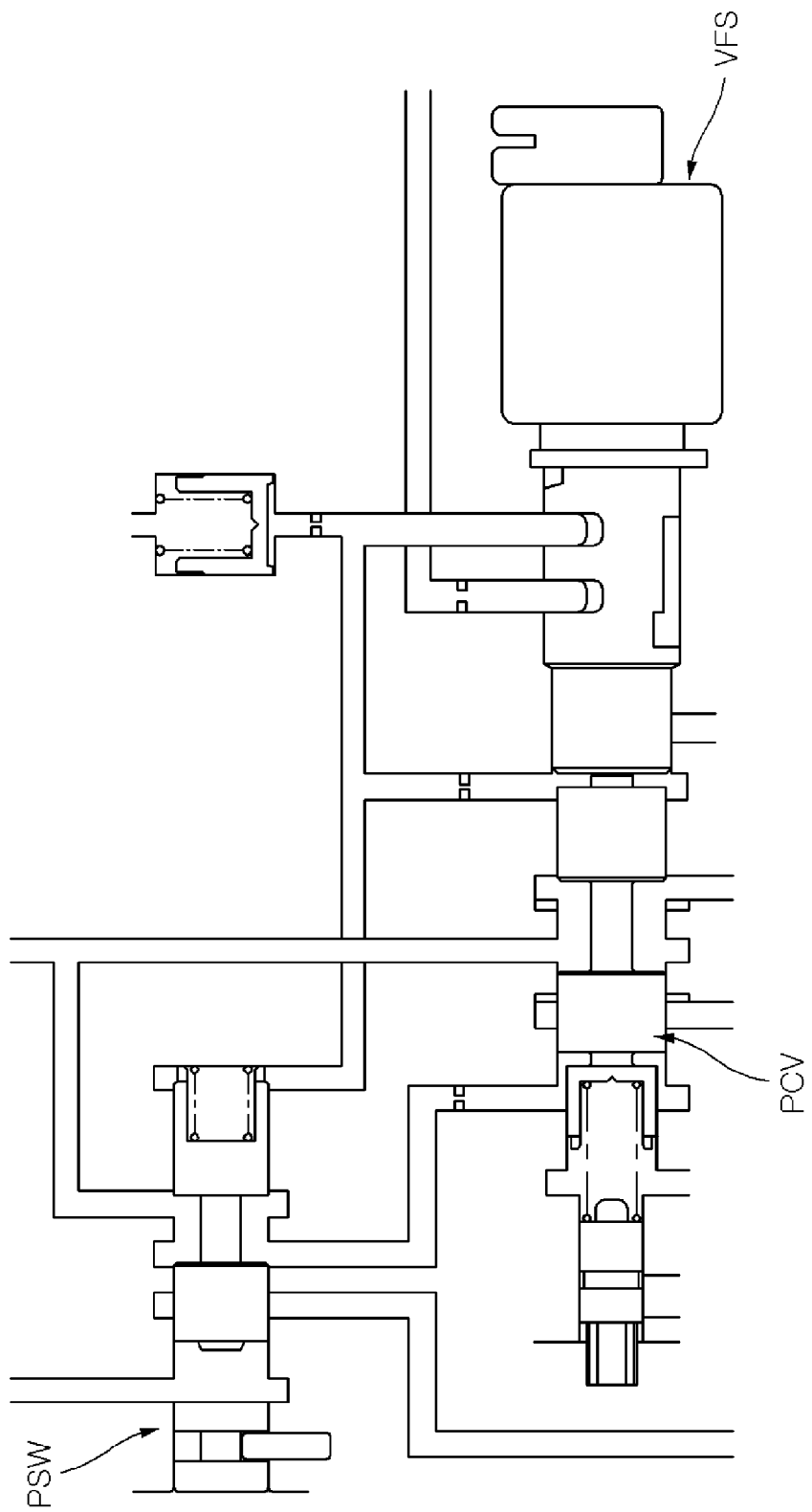
FIG. 7 is a view showing in detail the first clutch control unit shown in FIG. 3.

Therefore, in the figures, variable force solenoid valve VFS, pressure control valve PCV, and pressure switch valve PSW are designated by the same reference numerals and FIG. 7 representatively shows the structure of first clutch control unit CL1-CON in detail.

Figure 8:
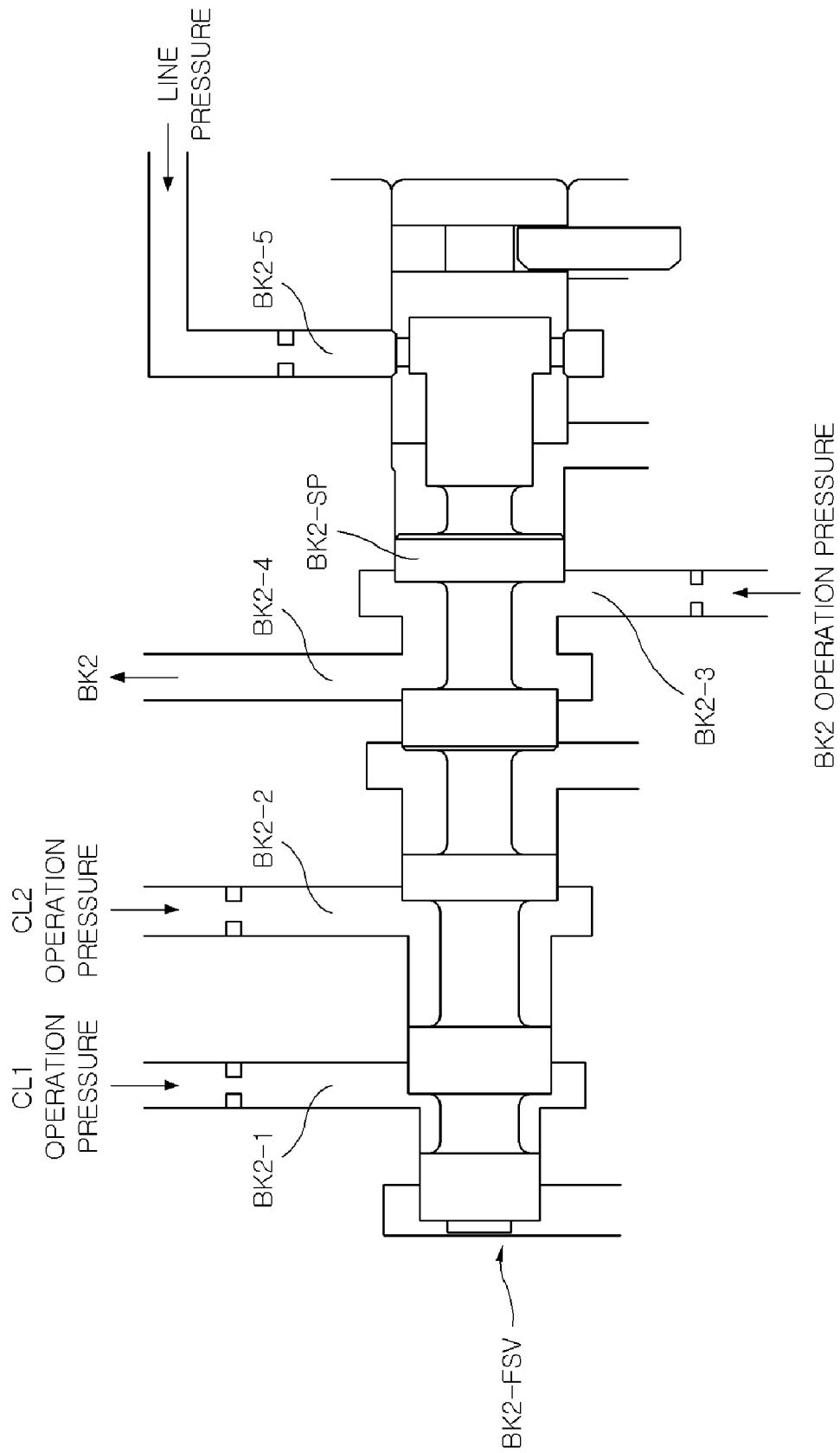
FIG. 8 is a view showing in detail the second brake fail-safe valve shown in FIG. 3.

Second brake fail-safe valve BKS-FSV, as shown in detail in FIG. 8, includes a first port BK2-1 that receives operation pressure supplied to first clutch CL1, in parallel with first clutch CL1, a second port BK2-2 that receives operation pressure supplied to second clutch CL2, in parallel with second clutch CL2, a third port BK2-3 and a fourth port BK2-4 through which operation pressure supplied to second brake BK2 from second brake control unit BK2-CON is transmitted inside and outside, respectively, a fifth port BK2-5 that receives the line pressure, a valve spool BK2-SP that closes third port BK2-3 and fourth port BK2-4 and removes the pressure of second brake BK2, only when operation pressure is simultaneously applied to first port BK2-1 and second port BK2-2, by making the operation pressure of first port BK2-1 and second port BK2-2 correspond to the line pressure of fifth port BK2-5.

Therefore, the hydraulic pressure of second brake BK2 is structurally removed while the operation pressure is respectively supplied to first clutch CL1 and second clutch CL2, which is because, referring to FIG. 2, a power train for a hybrid vehicle using the present invention do not have a mode for connecting first clutch CL1 and second clutch CL2 with second brake BK2.

Further, as described above, since first clutch control unit CL1-CON, second clutch control unit CL2-CON, and second brake control unit BK2-CON respectively includes normally-high type variable force solenoid valve VFS that increases the solenoid control pressure to the highest level, when they cannot be supplied with control current, the operation pressure can be supplied to first clutch CL1, second clutch CL2, and second brake BK2, when malfunction occurs in the electric device, in which when the operation pressure is supplied to both of first clutch CL1 and second clutch CL2, second brake fail-safe valve BK2-FSV mechanically stops and remove the operation pressure for second brake BK2 and generates that a 1,1 transmission gear ratio mode of two-stage fixed gear ratio, such that a limp home function can be implemented.

Figure 9:
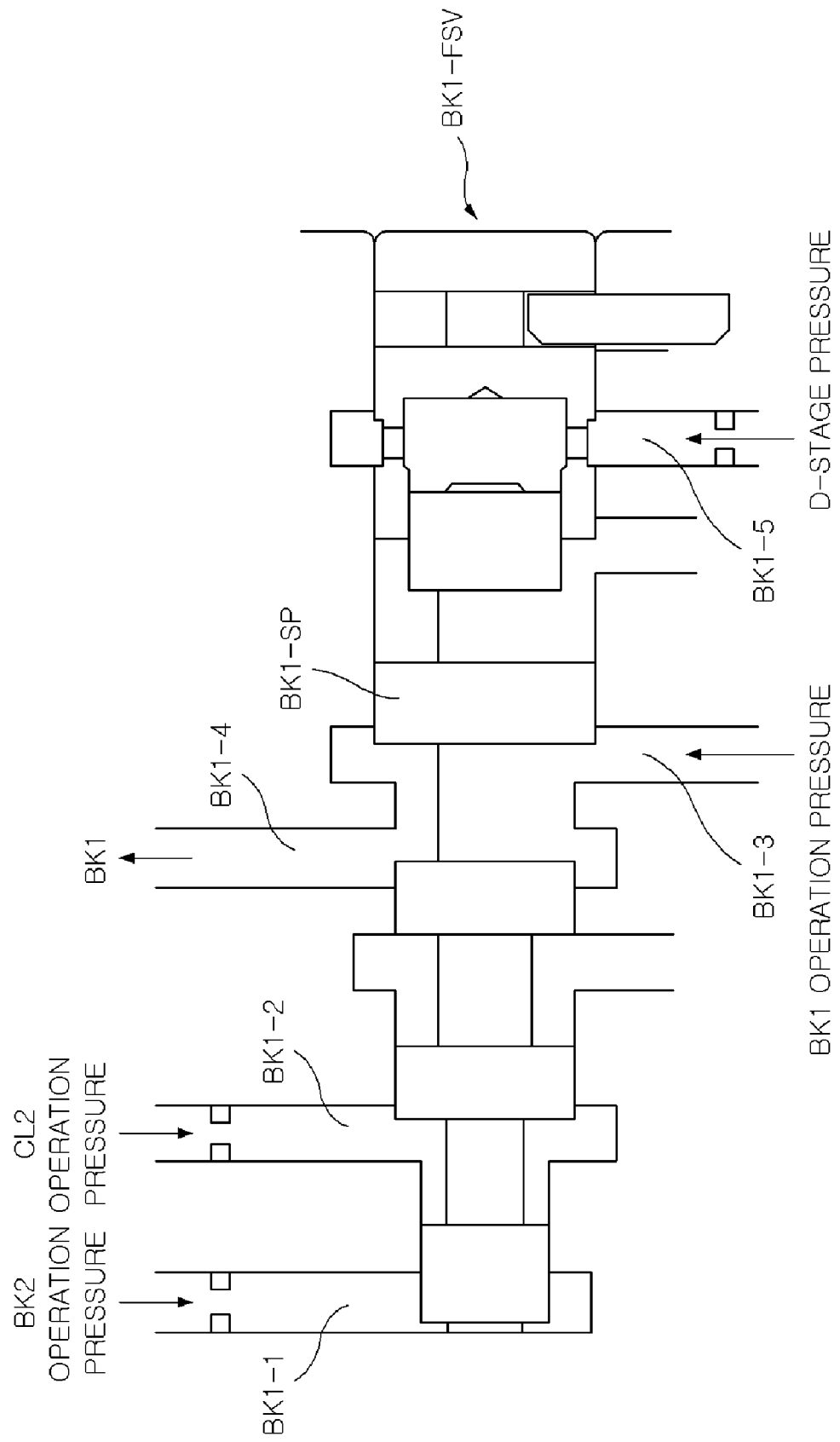
FIG. 9 is a view showing in detail the first brake fail-safe valve shown in FIG. 3.

First brake fail-safe valve BK1-FSV, as shown in detail in FIG. 9, includes a first port BK1-1 that receives operation pressure supplied to second brake BK2, in parallel with second brake BK2, a second port BK1-2 that receives operation pressure supplied to second clutch CL2, in parallel with second clutch CL2, a third port BK1-3 and a fourth port BK1-4 through which operation pressure supplied from first brake control unit BK1-CON to first brake BK1 is transmitted inside and outside, a fifth port BK1-5 that receives line pressure through D-stage port MVD of manual valve MV, and a valve spool BK1-SP that closes third port BK1-3 and fourth port BK1-4 and removes the pressure of first brake BK1, when operation pressure is applied to any one of first port BK1-1 and second port BK1-2, by making operation pressure of first port BK1-1 and second port BK1-2 to the line pressure of fifth port BK1-5.

Therefore, while operation pressure is supplied to any one of first brake BK2 and second clutch CL2, first brake fail-safe valve BK1-FSV removes hydraulic pressure of first brake BK1, and this is for structurally prevent an unexpected operational state is formed by first brake fail-safe valve BK1-FSV in any case, because, referring to FIG. 2, first brake BK1 is not connected with any member other than first clutch CL1 at a third fixed-stage mode.

R-stage fail-safe valve R-FSV, as shown in detail in FIG. 10, includes a first port R-1 that is connected with an R-stage port MV-R of manual valve MV, a second port R-2 and a third port R-3 through which the line pressure supplied from line pressure and lubrication pressure generating unit RL-CON to second clutch control unit CL2-CON are transmitted inside and outside, respectively, a valve spool R-SP that closes second port R-2 and third port R-3, when hydraulic pressure is applied to first port R-1 from R-stage port MV-R, and a bias spring R-S that makes valve spool R-SP elastically support second port R-2 and third port R-3 to be opened.

In the present embodiment, R-stage fail-sage valve R-FSV further includes a fourth port R-4 providing hydraulic pressure pressing valve spool R-SP together with bias spring R-S and fourth port R-4 is connected with first reducing valve RED1 to receive the first reducing pressure.

Although valve spool R-SP can make second port R-2 and third port R-3 connected with each other, only with bias spring R-S, unless R-stage operation pressure is applied to first port R-1, in order to ensure more stable operability, it has fourth port R-4 such that the first reducing pressure supplements the elastic force of bias spring R-S.

The power train for a hybrid vehicle according to an exemplary embodiment of the present invention can generate electricity with second motor generator MG2 by connecting only second clutch CL2 for charging the battery, and driving engine Engine, in the P-stage or N-stage state, which is performed by a controller without a user.

In order to implement the states, by making second clutch control unit CL2-CON be directly supplied with the line pressure, which is supplied for the operation pressure of second clutch CL2, through not manual valve MV, but R-stage fail-safe valve R-FSV, when R-stage operation pressure is supplied to R-stage fail-safe valve R-FSV by selecting the R-stage in manual valve MV, the line pressure supplied to second clutch control unit CL2-CON is mechanically stopped, thereby preventing second clutch CL2 from being mechanically connected.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control system of a power train for a hybrid vehicle, comprising:
   a line pressure and lubrication pressure generating unit that generates predetermined line pressure and lubrication pressure for lubrication, using hydraulic pressure supplied from an oil pump;
   a first reducing valve that generates first reducing pressure by decreasing the line pressure;
   a second reducing valve that generates second reducing pressure by decreasing the line pressure;
   a first clutch control unit that receives the line pressure, the first reducing pressure, and the second reducing pressure and controls a first clutch;
   a second clutch control unit that receives the line pressure, the first reducing pressure, and the second reducing pressure and controls a second clutch;
   a first brake control unit that receives the line pressure, the first reducing pressure, and the second reducing pressure and controls a first brake;

a second brake control unit that receives the line pressure, the first reducing pressure, and the second reducing pressure and controls a second brake; and a manual valve MV that receives the line pressure, and supplies the line pressure to the first brake control unit, the second brake control unit, and the first clutch control unit in a D-stage state, and supplies the line pressure to the second brake-control unit in the R-stage state;

wherein the manual valve has a D-stage port supplying the line pressure to the first brake control unit, the second brake control unit, and the first clutch control unit, an R-stage port supplying the line pressure to the second brake control unit, and a D-R check valve selectively supplying hydraulic pressure supplied from the D-state port and the R-stage port of the manual valve to the first clutch control unit and the second brake control unit.

2. The hydraulic control system of the power train for a hybrid vehicle as defined in claim 1, further comprising an R-N-D static control unit between the manual valve and the second brake control unit to relatively rapidly supply the line pressure from the manual valve to the second brake control unit, and relatively slowly remove the hydraulic pressure from the second brake control unit.

3. The hydraulic control system of the power train for a hybrid vehicle as defined in claim 2, wherein the R-N-D static control unit is disposed between the D-R check valve and the second brake control unit, and includes; an RND check valve that forms only a channel to the second brake control unit from the D-R check valve; an orifice that is formed in a channel detouring the RND check valve; and an accumulator that is disposed between the orifice and the second brake control unit.

4. The hydraulic control system of the power train for a hybrid vehicle as defined in claim 3, wherein the first brake control unit, the second brake control, unit, the first clutch control unit, and the second clutch control unit each includes:

a variable force solenoid valve that generates solenoid control pressure, using second reducing pressure received from the second reducing valve;

a pressure control valve that is integrally formed at one side of the variable force solenoid valve and outputs operation pressure for one corresponding operating member to control in the first brake, the second brake, the first clutch, and the second clutch, using the line pressure received; and a pressure switch valve that is converted to feedback or stop a portion of the operation pressure supplied to the corresponding operating member to control to the pressure control valve, using the first reducing pressure received from the first reducing valve at one side of the valve spool and the solenoid control pressure received from the variable force solenoid valve from the other side.

5. The hydraulic control system of the power train for a hybrid vehicle as defined in claim 4, further comprising a second brake fail-safe valve that includes: a first port that receives operation pressure supplied to the first clutch, in parallel with the first clutch;

a second port that receives operation pressure supplied to the second clutch, in parallel with the second clutch;

a third port and a fourth port through which operation pressure supplied to the second brake from the second brake control unit is transmitted inside and outside, respectively;

a fifth port that receives the line pressure;

a valve spool that closes the third port and the fourth port and removes the pressure of the second brake, only when operation pressure is simultaneously applied to the first port and the second port, by making the operation pressure of the first port and the second port correspond to the line pressure of the fifth port.

6. The hydraulic control system of the power train for a hybrid vehicle as defined in claim 4, further comprising a first brake fail-safe valve that includes: a first port that receives operation pressure supplied to the second brake, in parallel with second brake;

a second port that receives operation pressure supplied to the second clutch, in parallel with the second clutch;

a third port and a fourth port through which operation pressure supplied from the first brake control unit to the first brake is transmitted inside and outside;

a fifth port that receives line pressure through a D-stage port of the manual valve; and a valve spool that closes the third port and the fourth port and removes the pressure of the first brake, when operation pressure is applied to any one of the first port and the second port, by making operation pressure of the first port and the second port to the line pressure of the fifth port.

7. The hydraulic control system of the power train for a hybrid vehicle as defined in claim 4, wherein the first clutch control unit, the first brake control unit, and the second brake control unit are each connected such that the pressure control unit receives the line pressure from the D-stage port of the manual valve; and the second clutch control unit is connected such that the pressure control valve directly receives the line pressure from the line pressure and lubrication pressure generating unit without through the manual valve.

8. The hydraulic control system of the power train for a hybrid vehicle as defined in claim 7, further comprising an R-stage fail-safe valve R-FSV that includes: a first port that is connected with an R-stage port of the manual valve;

a second port and a third port through which the line pressure supplied from the line pressure and lubrication pressure generating unit to the second clutch control unit are transmitted inside and outside, respectively;

a valve spool that closes the second port and the third port, when hydraulic pressure is applied to the first port from the R-stage port; and a bias spring that makes the valve spool elastically support the second port and the third port to be opened.

9. The hydraulic control system of the power train for a hybrid vehicle as defined in claim 8, wherein the R-stage fail-safe valve further includes a fourth port receiving hydraulic pressure pressing the valve spool together with the bias spring and the fourth port is connected with the first reducing valve.

10. The hydraulic control system of the power train for a hybrid vehicle as defined in claim 4, wherein the variable force solenoid valve of the first clutch control unit, the second clutch control unit, and the second brake control unit are normally-high types that each increase the solenoid control pressure to the highest level when control current is not supplied;

and the variable force solenoid valve of the first brake control unit is a normally-row type that does not generate solenoid control pressure when control current is not supplied.

11. The hydraulic control system of the power train for a hybrid vehicle as defined in claim 1, wherein the first clutch, the second clutch, the first brake, and the second brake are included in the power train of a hybrid vehicle that includes:

a first planetary gear set including a first sun gear, a first carrier, and a first ring gear;

a second planetary gear set including a second carrier directly connected to the first ring gear, a second sun gear, and a second ring gear;

a first motor generator connected to the first sun gear of the first planetary gear set;

a second motor generator connected to the second sun gear of the second planetary gear set;

an engine connected to the first carrier of the first planetary gear set;

an output member connected to the second carrier of the second planetary gear set, and wherein the first clutch is disposed to connect/disconnect the first carrier and the second ring gear, wherein the second clutch is disposed to connect/disconnect the first carrier and the second sun gear, wherein the first brake is disposed to restrict rotation of the first sun gear, and wherein the second brake is disposed to restrict rotation of the second ring gear.

12. A hydraulic control system of a power train for a hybrid vehicle, comprising:

a line pressure and lubrication pressure generating unit that generates predetermined line pressure and lubrication pressure for lubrication, using hydraulic pressure supplied from an oil pump;

a first reducing valve and a second reducing valve that generate first reducing pressure and second reducing pressure by decreasing the line pressure;

a first clutch control unit, a second clutch control unit, a first brake control unit, and a second brake control unit that receive the line pressure, the first reducing pressure, and the second reducing pressure and respectively control a first clutch, a second clutch, a first brake, and a second brake, which are operating members to control;

a manual valve and a D-R check valve that receive the line pressure, supply the line pressure to the first brake control unit, the second brake control unit, and the first clutch control unit in a D-stage state, and supply the line pressure to the second brake-control unit and the first clutch control unit in an R-stage state;

an R-stage fail-safe valve that stops the line pressure and the lien line pressure directly supplied from the lubrication pressure generating unit to the second clutch control unit in the R-stage state;

a second brake fail-safe valve that removes the hydraulic pressure of the second brake when operation pressure is supplied to both the first clutch and the second clutch; and a first brake fail-safe valve that removes the hydraulic pressure of the first brake when operation pressure is supplied to any one of the second brake and the second clutch.

13. The hydraulic control system of the power train for a hybrid vehicle as defined in claim 12, wherein the line pressure and lubrication pressure generator includes: a variable force solenoid valve that receives the second reducing pressure from the second reducing valve and generates solenoid control pressure;

a regulator valve that is controlled by the solenoid control pressure from the variable force solenoid valve and generates the line pressure, using the hydraulic pressure supplied from the oil pump; and a lubrication pressure regulator valve that is controlled by the solenoid control pressure from the variable solenoid valve and generates the lubrication pressure, using the hydraulic pressure from the regulator valve.

14. The hydraulic control system of the power train for a hybrid vehicle as defined in claim 12, wherein the manual valve includes:

a line pressure port that receives line pressure from line pressure and lubrication pressure generating unit;

a D-stage port that supplies line pressure to the first brake control unit, the second brake control unit, and the first clutch control unit;

an R-stage port that supplies line pressure to the second brake control unit and the first clutch control unit; and a valve spool that implements a P-stage and an N-stage at the same position where the line pressure port is isolated, moves from the N-stage position to one side such that the line pressure port communicates with the D-stage port, and to the other side such that the line pressure port communicates with the R-stage port.

15. The hydraulic control system of the power train for a hybrid vehicle as defined in claim 14, wherein the D-R check valve includes:

a first port that is connected to the D-stage port of the manual valve;

a second port that is connected to the R-stage port of the manual valve;

a third port that is connected to the first clutch control unit and the second brake control unit; and a valve spool that slides straight such that the first port communicates with the third port when hydraulic pressure is supplied to the first port and the second port communicates with the third port when hydraulic pressure is supplied to the second port.

16. The hydraulic control system of the power train for a hybrid vehicle as defined in claim 15, further comprising an R-N-D static control unit between the manual valve and the second brake control unit to relatively rapidly supply the line pressure from the manual valve to the second brake control unit, and relatively slowly remove the hydraulic pressure from the second brake control unit.

17. The hydraulic control system of the power train for a hybrid vehicle as defined in claim 16, wherein the R-N-D static control unit is disposed between the D-R check valve and the second brake control unit, and includes; an RND check valve that forms only a channel to the second brake control unit; an orifice that is formed in a channel detouring the RND check valve; and an accumulator that is disposed between the orifice and the second brake control unit.

18. The hydraulic control system of the power train for a hybrid vehicle as defined in claim 12, wherein the first brake control unit includes:

a normally-low type variable force solenoid valve that generates solenoid control pressure using second reducing pressure received from the second reducing valve;

a pressure control valve that is integrally formed at one side of the variable force solenoid valve and outputs operation pressure of the first brake, using the line pressure; and a pressure switch valve that is converted to feedback or stop a portion of operation pressure, supplied to the first brake, to the pressure control valve, using the first reducing pressure received from the first reducing valve at one side and solenoid control pressure from the variable force solenoid valve from the other side.

19. The hydraulic control system of the power train for a hybrid vehicle as defined in claim 12, wherein the second brake control unit includes:

a normally-high type variable force solenoid valve that generates solenoid control pressure using second reducing pressure received from the second reducing valve;

a pressure control valve that is integrally formed at one side of the variable force solenoid valve and outputs operation pressure of the second brake, using the line pressure; and a pressure switch valve that is converted to feedback or stop a portion of operation pressure, supplied to the second brake, to the pressure control valve, using the first reducing pressure received from the first reducing valve at one side of a valve spool and solenoid control pressure from a variable force solenoid valve from the other side.

20. The hydraulic control system of the power train for a hybrid vehicle as defined in claim 12, wherein the first clutch control unit includes:

a normally-high type variable force solenoid valve that generates solenoid control pressure using second reducing pressure received from the second reducing valve;

a pressure control valve that is integrally formed at one side of the variable force solenoid valve and outputs operation pressure of the first clutch, using the line pressure; and a pressure switch valve that is converted to feedback or stop a portion of operation pressure, supplied to the first clutch, to the pressure control valve, using the first reducing pressure received from the first reducing valve at one side of a valve spool and solenoid control pressure from a variable force solenoid valve from the other side.

21. The hydraulic control system of the power train for a hybrid vehicle as defined in claim 12, wherein the second clutch control unit includes:

a normally-high type variable force solenoid valve that generates solenoid control pressure using second reducing pressure received from the second reducing valve;

a pressure control valve that is integrally formed at one side of the variable force solenoid valve and outputs operation pressure of the second clutch, using the line pressure; and a pressure switch valve that is converted to feedback or stop a portion of operation pressure, supplied to the second clutch, to the pressure control valve, using the first reducing pressure received from the first reducing valve at one side of a valve spool and solenoid control pressure from a variable force solenoid valve from the other side.

22. The hydraulic control system of the power train for a hybrid vehicle as defined in claim 12, the second brake fail-safe valve includes: a first port that receives operation pressure supplied to the first clutch, in parallel with the first clutch;

a second port that receives operation pressure supplied to the second clutch, in parallel with the second clutch:

a third port and a fourth port through which operation pressure supplied to the second brake from the second brake control unit is transmitted inside and outside, respectively;

a fifth port that receives the line pressure;

a valve spool that closes the third port and the fourth port and removes the pressure of the second brake, only when operation pressure is simultaneously applied to the first port and the second port, by making the operation pressure of the first port and the second port correspond to the line pressure of the fifth port.

23. The hydraulic control system of the power train for a hybrid vehicle as defined in claim 12, wherein the first brake fail-safe valve that includes:

a first port that receives operation pressure supplied to the second brake, in parallel with second brake;

a second port that receives operation pressure supplied to the second clutch, in parallel with the second clutch;

a third port and a fourth port through which operation pressure supplied from the first brake control unit to the first brake is transmitted inside and outside;

a fifth port that receives line pressure through a D-stage port of the manual valve; and a valve spool that closes the third port and the fourth port and removes the pressure of the first brake, when operation pressure is applied to any one of the first port and the second port, by making operation pressure of the first port and the second port to the line pressure of the fifth port.

24. The hydraulic control system of the power train for a hybrid vehicle as defined in claim 12, wherein the R-stage fail-safe valve R-includes:

a first port that is connected with an R-stage port of the manual valve;

a second port and a third port through which the line pressure supplied from the line pressure and lubrication pressure generating unit to the second clutch control unit are transmitted inside and outside, respectively;

a valve spool that closes the second port and the third port, when hydraulic pressure is applied to the first port from the R-stage port; and a bias spring that makes the valve spool elastically support the second port and the third port to be opened.

25. The hydraulic control system of the power train for a hybrid vehicle as defined in claim 24, wherein the R-stage fail-safe valve further includes a fourth port providing hydraulic pressure pressing the valve spool together with the bias spring and the fourth port is connected with the first reducing valve to receive the first reducing pressure.

26. The hydraulic control system of the power train for a hybrid vehicle as defined in claim 12, wherein the first clutch, the second clutch, the first brake, and the second brake are included in the power train of a hybrid vehicle that includes:

a first planetary gear set including a first sun gear, a first carrier, and a first ring gear;

a second planetary gear set including a second carrier directly connected to the first ring gear, a second sun gear, and a second ring gear;

a first motor generator connected to the first sun gear of the first planetary gear set;

a second motor generator connected to the second sun gear of the second planetary gear set;

an engine connected to the first carrier of the first planetary gear set; and an output member connected to the second carrier of the second planetary gear set, wherein the first clutch is disposed to connect/disconnect the first carrier and the second ring gear, wherein the second clutch is disposed to connect/disconnect the first carrier and the second sun gear, wherein the first brake is disposed to restrict rotation of the first sun gear, and wherein the second brake is disposed to restrict rotation of the second ring gear.

* * * * *